United States Patent
Roth et al.

[11] Patent Number: 5,885,637
[45] Date of Patent: Mar. 23, 1999

[54] METHOD FOR HEATING FOODSTUFFS

[75] Inventors: Eldon Roth; Nicholas Roth; Ronald Yockey, all of Dakota Dunes, S. Dak.; Fernando Leyva, Waterloo, Iowa; Boyd N. Brinson, McCook Lake, S. Dak.; Tommy R. Woolley, Waterloo, Iowa

[73] Assignee: Freezing Machines, Inc., Dakota Dunes, S. Dak.

[21] Appl. No.: 879,873

[22] Filed: Jun. 20, 1997

[51] Int. Cl.$^6$ .................................. A23P 1/00
[52] U.S. Cl. .................. 426/233; 426/513; 426/520; 426/523
[58] Field of Search ...................... 426/513, 518, 426/520, 523, 524, 233

[56] References Cited

U.S. PATENT DOCUMENTS 4,098,095  7/1978  Roth .................................... 426/524
5,132,137  7/1992  Reimann et al. ..................... 426/513

*Primary Examiner*—George Yeung
*Attorney, Agent, or Firm*—Shaffer & Culbertson, LLP; Russell D. Culbertson

[57] ABSTRACT

A method for heating foodstuffs, particularly mixtures made up of small pieces of meat, comprises pressurizing the uncooked mixture to force the mixture through a flow resistance device (22) at a heating velocity. Sufficient force is applied to the uncooked mixture to produce frictional resistance heating in the uncooked mixture as the mixture travels through the flow resistance device (22). The frictional resistance heats the uncooked mixture from an initial temperature to a final temperature which may be above a cooking temperature. This final temperature converts the uncooked mixture to a desired processed mixture. The invention may also include forming the processed mixture into a desired shape and cooling the processed mixture to a setting temperature. A variable resistance device (40) may be included in the flow resistance device (22) and used to control the level of heating in the foodstuffs.

27 Claims, 4 Drawing Sheets

METHOD FOR HEATING FOODSTUFFS

BACKGROUND OF THE INVENTION

This invention relates to food processing and particularly, heating or cooking raw or fresh foods. The apparatus and method according to the invention have particular application in heating meat to produce formed meat products.

Cooking a fresh or raw foodstuff changes its composition and characteristics. The cooking process requires heating the food material to some cooking temperature for a cooking period. The cooking temperature varies for different foods as does the cooking period. Regardless of the cooking temperature or period, the heat may be applied to the foodstuff directly in a suitable oven or through a container which holds the foodstuff.

There are a number of problems associated with many traditional foodstuff heating and cooking methods, particularly when applied to meats, including fish and poultry. One problem is volume and water loss during the heating process. In many traditional cooking methods, the foodstuff is open to the atmosphere as it goes through the relatively slow heating process. This allows significant water loss, reduces the volume of the final cooked product, and often makes the cooked product less desirable. This water and volume loss from heating is commonly referred to as cooking loss.

Another problem is that some prior heating techniques allowed the food material to cook or burn onto the container in which it was held during heating. The foodstuff had to be moved or stirred continuously to avoid this "cook on" or "burn on" and produce even heating through the product.

Cooking meat products made up of small pieces of meat poses additional problems. When a collection of meat pieces is heated in a traditional cooking technique, the pieces tend to separate. For example, unless it is carefully formed and handled, ground beef breaks up into the individual grinds upon cooking. This separation into individual grinds is a particular problem in prior continuous cooking devices which used blades to periodically scrape the device walls to prevent burn on. Even when formed and handled properly, the resulting cooked patty has a character entirely different from a solid piece of meat. That is, it is apparent from the texture and other characteristics of the cooked patty that it is made up of individual small pieces placed together for cooking.

Processes have been developed for producing formed meat products having characteristics more resembling a solid, traditional cut of meat. These forming processes produce a protein/meat surface interaction which may form a bond between adjacent pieces or chunks of meat in a mixture.

In these meat forming processes, a surface protein matrix is obtained using natural protein from the meat, or non-meat protein additives. The natural meat proteins for this process comprise the myofibrillar proteins, particularly myosin. These natural proteins are brought to the surface of the meat pieces by manipulating the meat pieces and, in some cases, by adding salt or otherwise chemically treating the mixture.

Once the surface protein matrix is produced in the mixture and the mixture is formed into the desired shape, the mixture is heated to at least partially de-nature the proteins. Upon cooling, the protein matrix coagulates and this coagulation binds the meat pieces together. The final internal temperature required to produce the desired coagulation upon cooling may range from 135° F. to 155° F. This temperature range is the range in which most myofibrillar proteins are heat de-natured and is also sufficient to cook the meat, that is, convert the oxymyoglobin in the meat to metamyoglobin.

These prior art meat forming processes are relatively slow and complicated and, therefore, expensive. Furthermore, the forming processes do not address the problem of cooking loss or of cook-on or burn-on, which may occur during the heating process.

SUMMARY OF THE INVENTION

It is a general object of the invention to provide a method and apparatus which overcome the above-described problems associated with heating and cooking foodstuffs. More particularly, it is an object of the invention to provide a heating method and apparatus for use in heating a mixture of meat pieces to produce a formed meat product.

To accomplish these objects, the method of heating foodstuffs avoids applying heat from an external source. Rather, heat is generated by applying energy to a mixture of uncooked food pieces to force the mixture through a restricting orifice or flow resistance device. The flow of the mixture through the orifice generates heat which is quickly and evenly distributed through the mixture to raise the temperature of the mixture. The temperature rise in the mixture may be controlled to produce any desired processing temperature in the mixture, including a cooking temperature high enough to cook the mixture. Also, when the foodstuff being processed comprises meats, the processing temperature may be high enough to allow the myofibrillar proteins to coagulate upon cooling to produce a product which resembles a solid meat structure rather than a structure made of small meat pieces.

When applied to cooking meat, the method of the invention first includes producing an uncooked mixture comprising pieces of uncooked meat at a temperature below the cooking temperature. As used herein, "meat" includes not only beef, but also pork, poultry, and fish, for example. The uncooked mixture may also include fat and other material associated with meat, either attached to the meat pieces or separate from the meat pieces. Non-meat additives and protein including egg solids, milk solids, and vegetable proteins, for example, may also be included in the mixture.

In the preferred form the invention, energy is applied to the uncooked mixture by compressing the uncooked mixture to a processing pressure. The processing pressure is used to force or displace the uncooked mixture through the flow resistance device which preferably comprises a small diameter, elongated conduit. The flow resistance device may also include variable resistance means for enabling the flow resistance to be varied. The processing pressure forces the uncooked mixture through the flow resistance device at a velocity sufficient to produce frictional resistance heating in the uncooked mixture. It is believed that the friction is produced by the movement of the mixture with respect to the flow resistance device and by movement between the pieces of material within the mixture itself. In any event, the heat produced as the uncooked material flows through the flow resistance device quickly heats the uncooked mixture. Also, where a variable flow resistance device is employed, the flow resistance may be varied to control the heating produced across the device.

The heat produced according to the invention may be sufficient to heat the uncooked mixture to a cooking temperature. For meats, the cooking temperature is a temperature sufficient to convert oxymyoglobin in the mixture to metamyoglobin and at least partially denature the other proteins in the mixture. For example, the cooking temperature for meats may be approximately 135° F. or higher, although temperatures near 135° F. will normally not completely cook meats.

Where the uncooked mixture is heated to a cooking temperature, the uncooked mixture is converted to a cooked mixture. The term "cooked mixture" is not used herein to indicate that all of the material in the mixture is converted to a "cooked" condition. For example, for mixtures of meats, the "cooked mixture" does not necessarily indicate that all proteins in the mixture are de-natured. Rather, the level of doneness in the cooked mixture may be varied to suit the desired product. Thus, the cooked mixture, as used herein, means a mixture having at least some of the material de-natured or converted from an uncooked condition to a cooked condition for that particular material. For meats, the cooked condition means that at least a portion of the oxymyoglobin is converted to metamyoglobin.

Once the uncooked mixture is converted to the desired processed mixture, the mixture may be formed into a desired shape and then cooled to partially set the material in the desired shape. In the preferred form of the invention, the forming means comprises a roller-type machine such as that shown in U.S. Pat. No. 4,098,095. The roller-type forming machine allows the processed mixture to be quickly formed into a sheet and cooled below the processing temperature rapidly to stop further denaturing or cooking in the material. This rapid cooling below a processing temperature allows the cooled product to maintain a fresher appearance when reheated and further controls cooking losses.

The temperature to which the processed and formed mixture is cooled depends upon the type of material being processed and the manner in which it will be used. In meats, the cooked mixture is cooled to a setting temperature to cause proteins surrounding the meat pieces to at least partially stabilize and bond the meat pieces together to some extent.

The heating apparatus and method according to the invention has several advantages over prior art heating and cooking systems. The heating method disclosed and claimed herein is inexpensive and provides for very rapid and thorough heating. Also, by generating heat through the movement of material, the method eliminates the problem of cook-on or burn-on. The method according to the invention also greatly reduces cooking losses and allows meat products to be formed after cooking. The cooked product may be cooled rapidly after cooking or partial cooking causing the cooked material to have a better appearance and taste upon reheating. Furthermore, meats may be heated according to the invention to partially cook the material and kill bacteria. The partially cooked meat product may then be cooled quickly for shipping and storage, and then fully cooked just prior to serving. Fully cooking the meat just prior to serving produces a fresh cooked taste and appearance in the product. Prior meat cooking methods did not allow partial cooking of a formed meat product since cooking was done from the outside to the interior of the previously formed material. Leaving the product partially cooked in a prior art cooking method left a raw or substantially uncooked center with a fully cooked exterior.

These and other objects, advantages, and features of the invention will be apparent from the following description of the preferred embodiments, considered along with the accompanying drawings.

DESCRIPTION OF THE PREFERRED EMBODIMENTS

Figure 1:
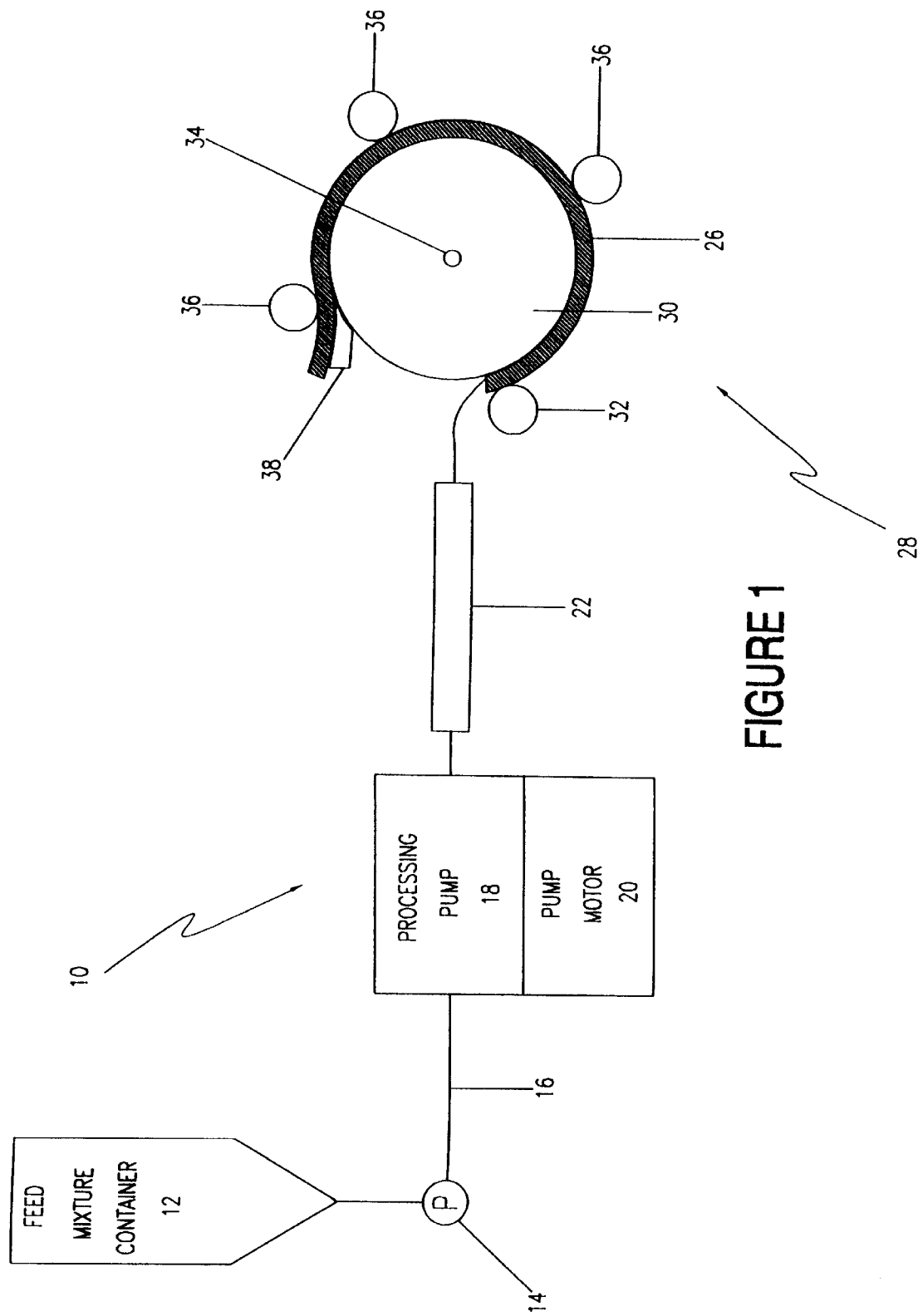
FIG. 1 is a mostly diagrammatic drawing showing a foodstuff heating apparatus embodying the principles of the invention.

FIG. 1 shows an apparatus 10 for heating or cooking foodstuffs. The apparatus 10 shown in FIG. 1 is particularly suited for heating mixtures made up of small pieces of meat, including ground meat. Therefore, the invention will be discussed in this disclosure predominantly in terms of its application to heating or cooking meats. However, those skilled in the art will readily appreciate that the heating method and apparatus according to the invention is not limited to meats. While the forming and setting aspects of the invention are applicable primarily to meats and non-meat protein mixtures, the heating aspect of the invention is applicable to any foodstuff. The invention may be used to heat substantially any foodstuff which is in a pumpable or flowable condition or may be placed in such a condition. Also, the foodstuff to be heated may be raw or may have been previously heated or cooked.

The apparatus 10 includes a feed mixture container or vessel 12. The feed mixture container 12 may be used to form the desired uncooked mixture at an initial temperature. Where the mixture is to be cooked the initial temperature is below a cooking temperature. The uncooked mixture may comprise pieces or chunks of uncooked meat, fat, and any additives desired in the mixture. Although not shown in the drawings, the container 12 may include various types of mixing elements to stir or otherwise manipulate the material to maintain a uniform uncooked mixture.

A feed pump 14 receives the uncooked mixture from the container 12 and feeds the uncooked mixture through conduit 16 to a processing pump 18. The processing pump 18 is driven by a pump motor 20 to apply sufficient force to the uncooked mixture to force the mixture through a flow resistance device 22 at a heating velocity high enough to produce heating in the mixture. To apply the required force, the pump 18 pressurizes the uncooked mixture to a processing pressure. Although the processing pressure required to produce a particular amount of heating will depend upon the diameter and length of the flow resistance device and the nature of the mixture and its constituents, the processing pressure will normally be at least approximately 2,500 psig to produce the required force for heating and over 5,000 psig to produce the required force for cooking meat products.

The invention relies upon the conversion of power applied to the uncooked mixture to heat energy by frictional resistance heating in the flow resistance device 22. Thus, the amount of heating produced in the uncooked mixture is dependent primarily upon the input power applied with the processing pump 18, the volume or weight of mixture being processed, the resistance to flow in the flow resistance device 22, and the flow characteristics of the mixture. The flow resistance device 22 is chosen to provide sufficient flow resistance so that the net power applied by the processing pump 18 to the uncooked mixture drives the uncooked mixture through the flow resistance device at a desired heating or processing rate. The heating or processing rate is that rate which matches the heating capacity of the net pump input power to the desired heating in the uncooked mixture. For example, assuming a 15% mechanical power loss in the processing pump and a specific heat of 0.7 for the uncooked mixture, one horsepower applied to the uncooked mixture by the processing pump can raise 3090 pounds of the uncooked mixture per hour one degree Fahrenheit. If the flow resistance provided by the flow resistance device 22 restricts the flow of uncooked mixture to 3090 pounds per hour, each one horsepower input would raise the temperature of this volume 1° Fahrenheit.

The preferred flow resistance device 22 comprises a small diameter conduit having an inlet end connected to the output of pump 18 and an opposite outlet end. The internal diameter of the conduit depends upon the amount of heating required and the nature of the material in the mixture, and may be as small as ⅛ inch (0.125 in.). The length of the flow resistance conduit is matched to the internal diameter to provide the desired overall flow resistance and may be as little as twelve inches (12 in.) to provide significant heating. However, conduit lengths as little as four inches (4 in.) may provide some heating. The heating velocity in the flow resistance conduit may be 500 inches per second or higher to produce the desired heating.

Raising the uncooked mixture to a cooking temperature converts the uncooked mixture to a cooked mixture. The cooked mixture may then be formed into a desired shape and cooled for packaging or further processing. For mixtures made up of meat, the cooked mixture is cooled to a setting temperature which is a temperature required to at least partially coagulate or stabilize the myofibrillar proteins in the mixture. This setting temperature may be approximately 70° F. or below.

The preferred forming means 28 for forming the cooked mixture into a desired shape comprises a first roller or drum 30 for receiving the cooked material from an outlet end of the conduit 22. A second roller 32 presses the cooked mixture 26 onto the outer surface of the first roller 30 to produce a sheet of material having a substantially uniform thickness. Such a forming apparatus is disclosed in U.S. Pat. No. 4,098,095 for use with uncooked material. In the roller forming apparatus 28, the means for cooling the cooked mixture is preferably incorporated into the first roller 30. As shown fully in U.S. Pat. No. 4,098,095, a refrigerant fluid may be circulated through the interior of the first roller 30 through connectors 34 aligned with the axis of rotation of the first roller 30. Additional rollers 36 help press the cooked mixture onto the roller 30. The cooked and cooled mixture may then be scraped from the surface of the roller 30 with the scraper 38, and removed for further processing or packaging. The cooling arrangement may be used not only to cool the cooked mixture to a setting temperature, but also to freeze the material for packaging.

Figure 2:
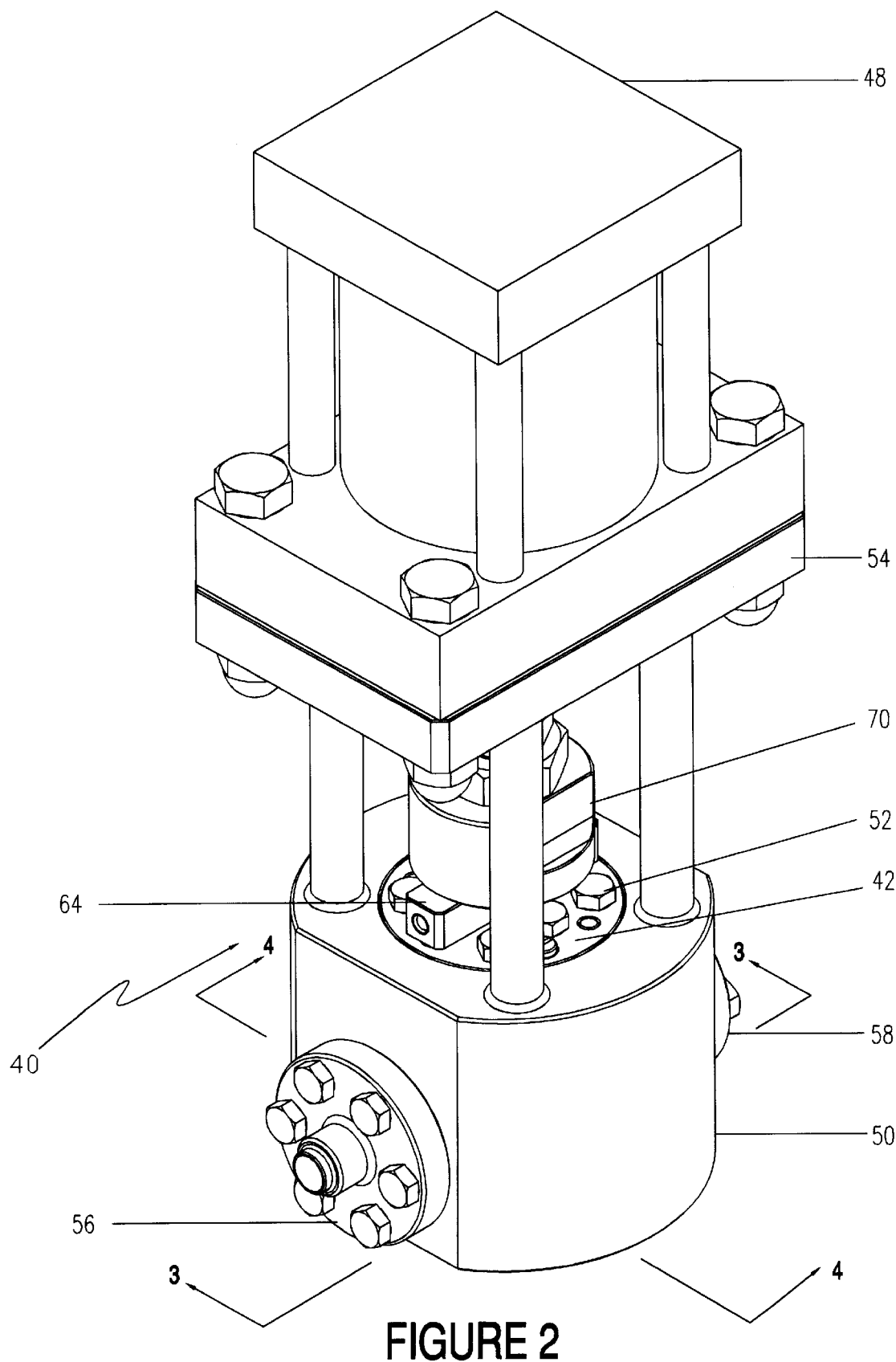
FIG. 2 is a view in perspective of a variable flow resistance device embodying the principles of the invention.
Figure 3:
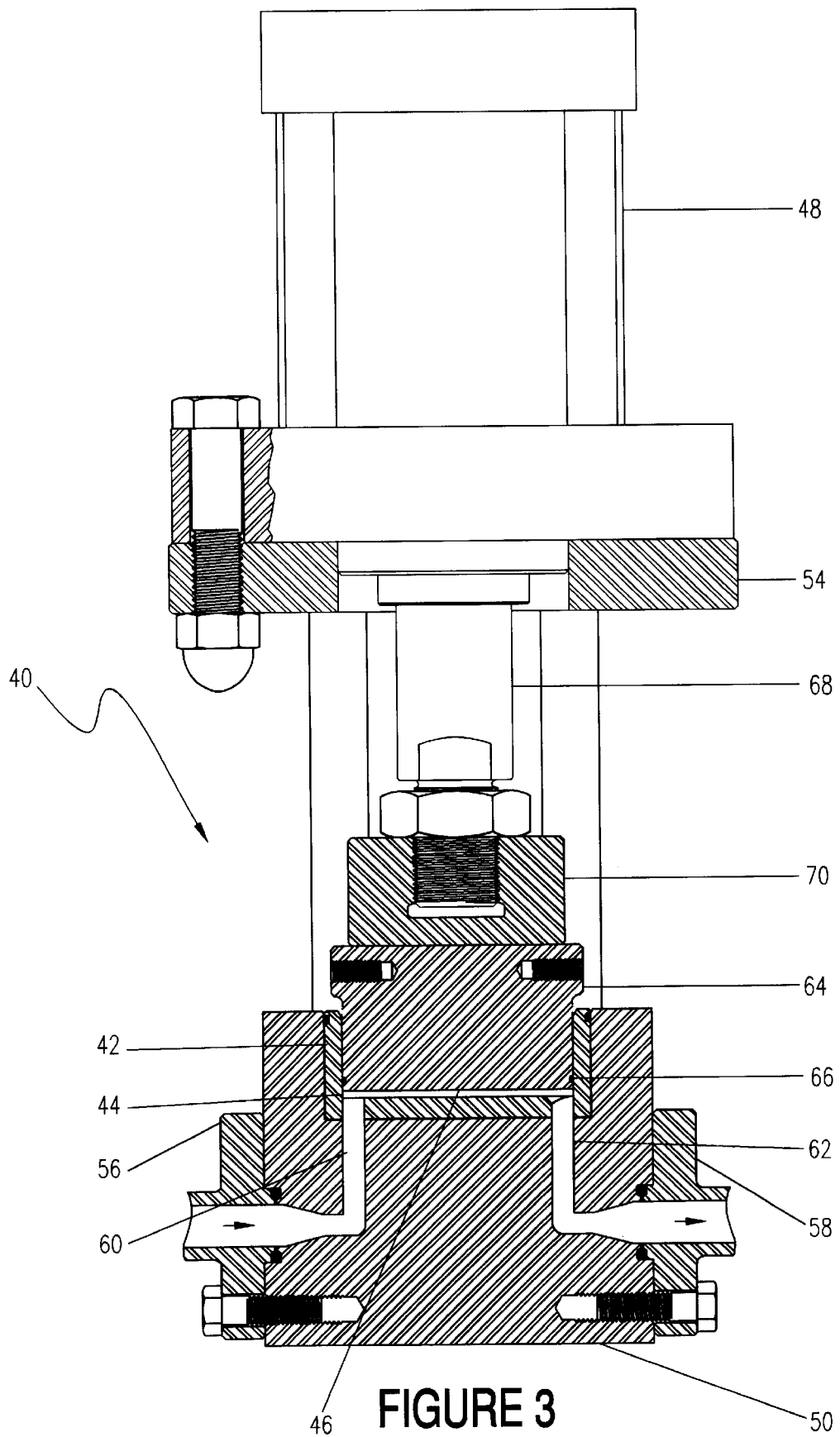
FIG. 3 is a partial section view taken along line 3—3 in FIG. 2.
Figure 4:
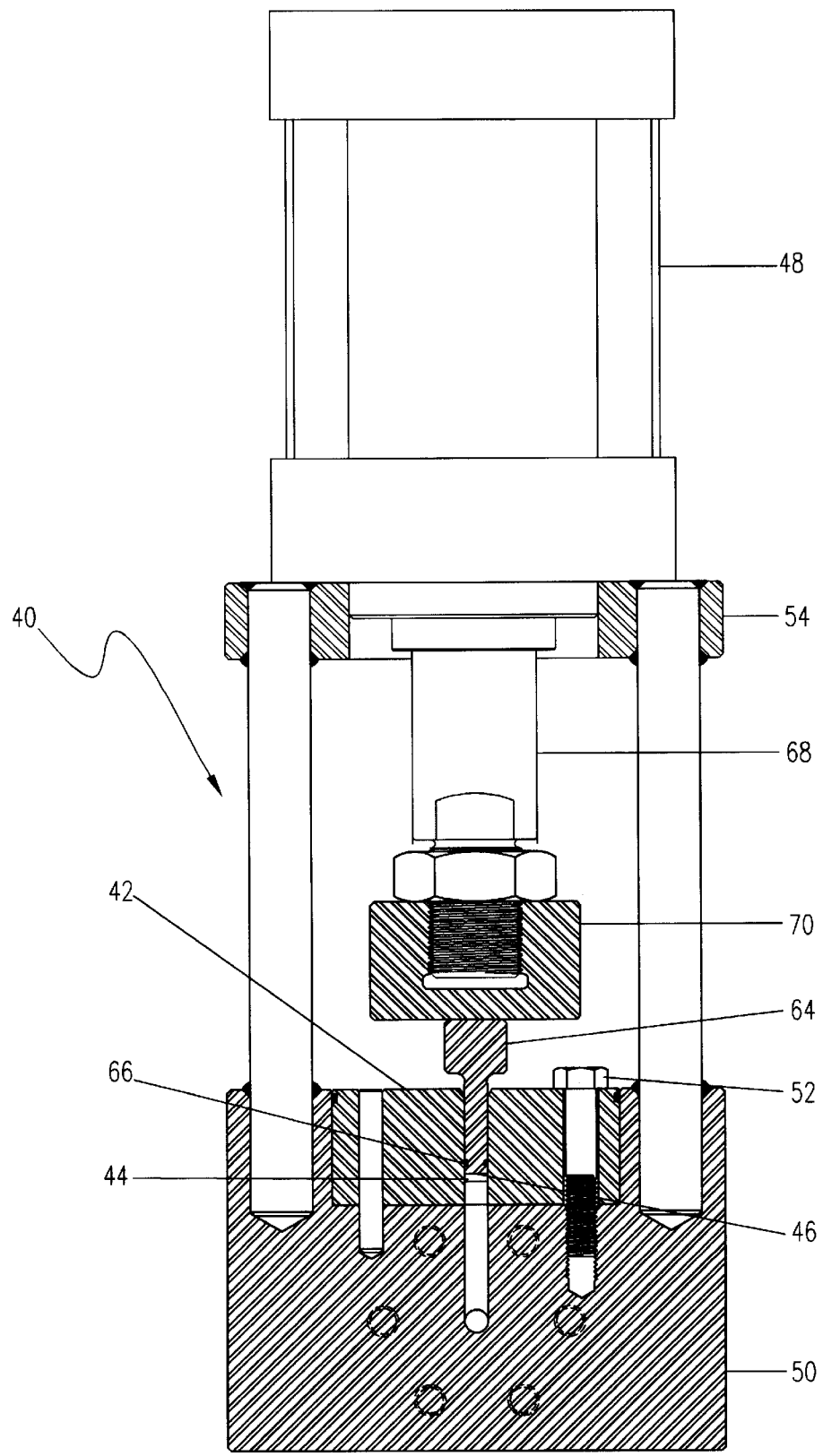
FIG. 4 is a partial section view taken along line 4—4 in FIG. 2.

FIGS. 2, 3, and 4 illustrate a variable resistance device or means 40 which may be used by itself or in connection with an elongated, small-diameter conduit to serve as the flow resistance device 22 shown in FIG. 1. Two or more of the variable resistance devices 40 may be connected in series to provide greater variation in flow resistance. Whether used alone, in a series with others, or with regular conduits, the variable resistance device 40 allows the flow resistance to be varied to achieve the desired heating in the mixture being processed. The variable resistance device 40 also provides a convenient means for controlling the heating process. Temperatures sensed at the outlet of the variable resistance device 40, or elsewhere in the system, may be used as a control signal by a suitable control system to vary the resistance provided by the variable resistance device 40 and thus control the level of heating.

Referring particularly to FIGS. 3 and 4, the variable resistance device 40 includes a body 42 defining an elongated cavity 44. One surface 46 of the elongated cavity 44 is moveable with respect to the other surfaces of the cavity. A positioning unit 48 operates to position the moveable surface 46 with respect to the other cavity surfaces to produce a desired cross-sectional flow area in the cavity and thereby vary the flow resistance provided by the cavity.

In the illustrated form of the invention, the body 42 in which the cavity 44 is formed is removable from a base 50 and held in place by bolts 52. The base 50 includes a top flange 54 for receiving the positioning unit 48, and input and output flanges, 56 and 58 respectively. An inlet passage 60 is open at one end to the cavity 44 for directing material into the cavity, and an outlet passage 62 is open to the cavity at the opposite end allowing material to exit the cavity.

The moveable surface 46 comprises one end of a control element 64 which is slideably received in the cavity 44 and is sealed against the cavity walls with a sealing device 66. As the control element 64 moves upwardly in the drawing, it leaves the cavity 44 with a larger transverse cross-sectional area. As the control element 64 moves downwardly in the drawing, the moveable surface 46 moves closer to the bottom surface of the cavity 44 producing a lower transverse cross-sectional area through the cavity 44.

The position of the control element 64 and thus, the moveable surface 46, is controlled by the positioning unit 48 which is bolted to the top flange 54 of the base 50. The positioning unit 48 includes a rod 68 which extends to move the control element 64 downwardly and retracts to allow the control element to move upwardly under the pressure of material in the cavity 44. A positioning block 70 is interposed between the rod 68 and the control element 64, and functions to apply force between the rod and the control element over a large area of the control element.

The components of the variable resistance device 40 are all made from a suitable food handling grade material, preferably stainless steel. Pressures in the cavity 44 may reach over 10,000 psig and the components must be designed to withstand these high pressures. The positioning unit 48 may comprise a mechanical, or preferably, a hydraulic press capable of applying sufficient force to the control element 64 to maintain or change its position with respect to the cavity 44.

One preferred use of the variable resistance device 40 is to provide continuous control of heating in the apparatus 10 shown in FIG. 1. The temperature of the material being processed in the apparatus 10 may be sensed at the outlet of the flow restricting device 22 and used as a control signal to vary the flow resistance provided by one or more variable resistance devices 40 which may be included in the flow resistance device 22. To reduce the temperature at the outlet of the flow resistance device 22, the positioning unit 48 operates to increase the transverse cross-sectional flow area in the cavity 44. To increase the temperature at the outlet of the flow resistance device 22, the positioning unit 48 operates to move the moveable surface 46 downwardly, decreasing the cross-sectional flow area through the cavity 44.

EXAMPLES

The cooking method according to the invention was tested using a processing pump comprising a reciprocating piston pump driven by approximately 80 horsepower. The processing pump output was connected to a sixty inch (60 in.) long conduit having a constant internal diameter of 3/16 inch (0.1875 in.). All of the materials exposed to the material being processed comprised either stainless steel or a food handling grade plastic.

The mixture processed in the test was made up of an uncooked mixture comprising lean meat pieces containing approximately 5% to 6% fat. This mixture was maintained at an initial temperature of approximately 106° F. The pump was operated to force the uncooked mixture into the conduit at approximately 5,000 psig. The pressure at the outlet end of the conduit was maintained at near atmospheric pressure. After the apparatus was operated for approximately one or two minutes to reach a steady state condition, the temperature of the mixture at the outlet end of the conduit was measured at 132° F. The estimated residence time of the mixture in the conduit was less than one second. It is estimated that an input or processing pressure of 11,350 psia would be required to increase the temperature of the mixture from 106° F. to 165° F., using a 3/16 inch internal diameter conduit approximately 136 inches in length.

In another example, the same sort of meat mixture described above was heated to 120° F. and then pumped through the same orifice having a 3/16 inch diameter and a length of 60 inches. At an operating pressure of approximately 5,000 psig, the temperature of the mixture was increased from 120° F. to 127° F.

The above described preferred embodiments are intended to illustrate the principles of the invention, but not to limit the scope of the invention. Various other embodiments and modifications to these preferred embodiments may be made by those skilled in the art without departing from the scope of the following claims. For example, although the invention is illustrated as a single stage heating arrangement in FIG. 1, multiple stages in series may be used to provide heating. Each stage would require a separate processing pump 18 and flow resistance device 22. One advantage of a multiple stage heating arrangement would be the use of lower pressure in each stage to produce an overall level of heating similar to a single stage device operating at a higher pressure.

We claim:

1. A method for heating meat products, the method comprising the steps of:
   (a) producing an uncooked mixture comprising uncooked meat pieces at an initial temperature; and
   (b) forcing the uncooked mixture through a flow resistance tube at a heating velocity to produce frictional resistance heating in the uncooked mixture and raise the temperature of the uncooked mixture to a final temperature above the initial temperature, thereby converting the uncooked mixture to a processed mixture.

2. The method of claim 1 wherein the initial temperature is below a cooking temperature and the final temperature is a temperature above a cooking temperature so that the processed mixture comprises a cooked material.

3. The method of claim 1 further comprising the step of:
   (a) pressurizing the uncooked mixture to a processing pressure to force the uncooked mixture through the flow resistance device at the heating velocity.

4. The method of claim 3 wherein the processing pressure is at least 2,500 psig.

5. The method of claim 3 further comprising the step of maintaining the pressure of the processed mixture at an outlet of the flow resistance device at approximately atmospheric pressure.

6. The method of claim 1 wherein the flow resistance tube comprises a tube having an internal diameter of aroximately 0.125 inches and a length of at least twelve inches.

7. The method of claim 1 further comprising the steps of:
   (a) forming the processed mixture into a desired shape; and
   (b) cooling the processed mixture to a setting temperature.

8. The method of claim 7 wherein the step of forming the processed mixture into a desired shape comprises:
   (a) spreading the processed mixture out into a sheet of said material.

9. The method of claim 7 wherein the setting temperature is a temperature below approximately 70° F.

10. The method of claim 2 further comprising the step of reducing the temperature of the formed and cooled processed mixture to a temperature below approximately 32° F.

11. The method of claim 2 wherein the cooking temperature is at least 135° F.

12. The method of claim 1 wherein the heating velocity is above approximately 500 inches per second.

13. A method for heating meat products, the method comprising the steps of:
    (a) producing an uncooked mixture comprising uncooked meat pieces at an initial temperature;
    (b) pressurizing the uncooked mixture to a processing pressure; and
    (c) directing the pressurized uncooked mixture through a flow resistance tube while maintaining a reduced pressure at an outlet end of the flow resistance tube, the resistance to the flow of the uncooked mixture through the flow resistance tube raising the temperature of the uncooked mixture to a processed temperature and thereby converting the mixture to a processed mixture.

14. The method of claim 13 wherein the initial temperature is below a cooking temperature for the uncooked meat pieces and wherein the processed temperature is a temperature above the cooking temperature.

15. The method of claim 13 wherein the processing pressure is at least 2,500 psig.

16. The method of claim 15 further comprising the step of:
    (a) maintaining the pressure of the processed mixture at an outlet of the flow resistance device at approximately atmospheric pressure.

17. The method of claim 13 wherein the flow resistance tube comprises a tube having an internal diameter of approximately 0.125 inches and a length of at least twelve inches.

18. The method of claim 13 further comprising the steps of:
    (a) forming the processed mixture into a desired shape; and
    (b) cooling the processed mixture to a setting temperature.

19. The method of claim 18 wherein the step of forming the processed mixture into a desired shape comprises:
    (a) spreading the processed mixture out into a sheet of said material.

20. The method of claim 18 wherein the setting temperature is a temperature below approximately 70° F.

21. The method of claim 18 further comprising the step of reducing the temperature of the formed and cooled processed mixture to a temperature below approximately 32° F.

22. The method of claim 14 wherein the cooking temperature is at least 135° F.

23. A method of heating foodstuffs, the method comprising the steps:
    (a) producing an input mixture comprising pieces of foodstuffs at an initial temperature; and
    (b) applying a force to the input mixture to displace the input mixture through a flow resistance tube to produce frictional heating in the input mixture, the frictional heating generated during the displacement through the flow resistance tube raising the temperature of the input mixture from the initial temperature to a processing temperature.

24. The method of claim 23 wherein the displacement of the input mixture through the flow resistance tube raises the temperature of the input mixture from the initial temperature to the processing temperature in less than approximately three seconds.

25. The method of claim 23 further comprising the step of:
   (a) varying the flow resistance provided by the flow resistance tube to control the frictional heating generated as the input mixture is displaced through the flow resistance device.

26. The method of claim 25 further comprising the step of:
   (a) sensing the temperature of the mixture at an outlet of the flow resistance tube; and
   (b) controlling the flow resistance provided by the flow resistance tube with said sensed temperature.

27. The method of claim 25 wherein the flow resistance tube includes an elongated cavity and the step of varying the flow resistance comprises:
   (a) moving a positionable surface of the elongated cavity with respect to the remainder of the surfaces of the elongated cavity, thereby changing the effective flow area through the elongated cavity.

* * * * *